United States Patent [19]
Parker

[11] Patent Number: 5,885,040
[45] Date of Patent: Mar. 23, 1999

[54] TIE-DOWN WITH STRAP AND STRAP TENSION INDICATOR

[75] Inventor: Robert D. Parker, Seal Beach, Calif.

[73] Assignee: McDonnell Douglas Corporation, Huntington Beach, Calif.

[21] Appl. No.: 883,888

[22] Filed: Jun. 27, 1997

[51] Int. Cl.[6] ...................................................... B60P 7/08
[52] U.S. Cl. ............................... 410/50; 410/49; 410/97; 410/100; 411/9; 411/14
[58] Field of Search .................................. 410/47, 49, 50, 410/97, 100; 24/278, 280; 411/9, 14; 105/362

[56] References Cited

U.S. PATENT DOCUMENTS

| | | | |
|---|---|---|---|
| 1,274,688 | 8/1918 | Cooper et al. | 24/280 X |
| 1,684,666 | 9/1928 | Frazier | 24/280 |
| 2,684,825 | 7/1954 | Laviana et al. | 410/49 |
| 2,901,201 | 8/1959 | Taylor et al. | 410/50 |
| 3,147,127 | 9/1964 | Payne | 24/280 X |
| 3,601,868 | 8/1971 | Elsner . | |
| 3,823,639 | 7/1974 | Liber . | |
| 3,864,953 | 2/1975 | Fletcher et al. . | |
| 4,041,776 | 8/1977 | Payne . | |
| 4,525,114 | 6/1985 | Hirst . | |
| 4,685,412 | 8/1987 | Harris et al. | 410/47 X |
| 4,909,685 | 3/1990 | Hirst . | |
| 5,065,688 | 11/1991 | Moody | 410/47 X |
| 5,222,849 | 6/1993 | Walton . | |
| 5,226,765 | 7/1993 | Walton . | |
| 5,291,789 | 3/1994 | Walton . | |
| 5,584,627 | 12/1996 | Ceney et al. . | |
| 5,668,323 | 9/1997 | Waxman | 411/14 X |

FOREIGN PATENT DOCUMENTS

| | | | |
|---|---|---|---|
| 532233 | 10/1956 | Canada | 24/280 |
| 94/11220 | 5/1994 | WIPO | 410/100 |

OTHER PUBLICATIONS

"Calibrated Bolt Indicates Tension," Machine Design, May 23, 1996, 1 page.

*Primary Examiner*—Stephen T. Gordon
*Attorney, Agent, or Firm*—Senniger, Powers, Leavitt & Roedel

[57] ABSTRACT

A tie-down comprising a flexible strap adapted to be wrapped around an object to be tied down, a first member at one end of the strap having a first hole formed therein and a second member to which the other end of the strap is attached having a second hole formed therein in alignment with the first hole. A fastener having a head and a threaded shank is arranged with the head engaging the first member and with the shank extending through the first and second holes and having a threaded end portion projecting out of the second hole. A nut is threaded on the projecting end portion of the shank and engaged against the second member for being turned to act through the fastener for drawing the first and second members together to tighten the strap around the object and place the fastener and the strap under a predetermined tension. The fastener has an indicator for indicating the tension in the fastener and thereby indicating the tension in the strap. The first member is formed for observation of the indicator.

5 Claims, 4 Drawing Sheets

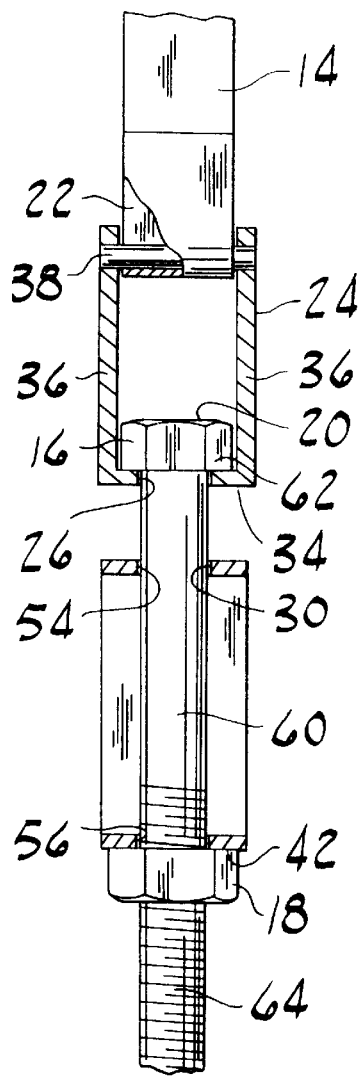
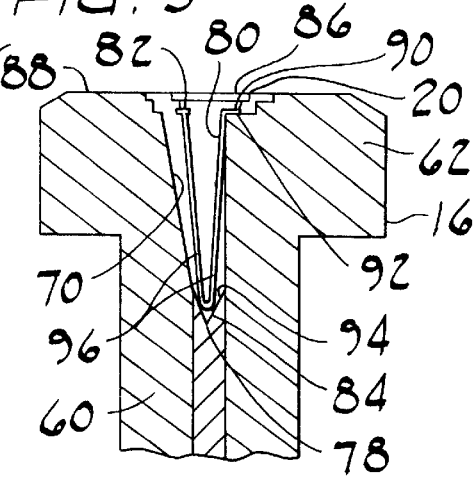
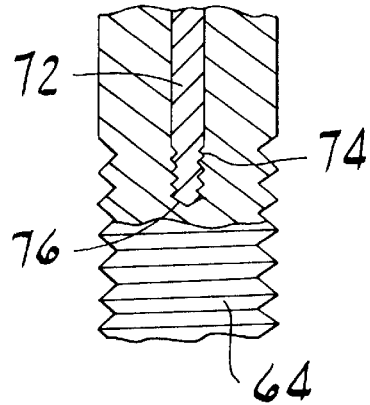
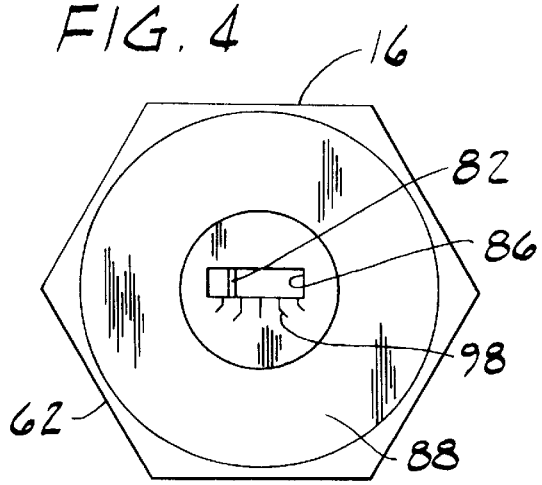

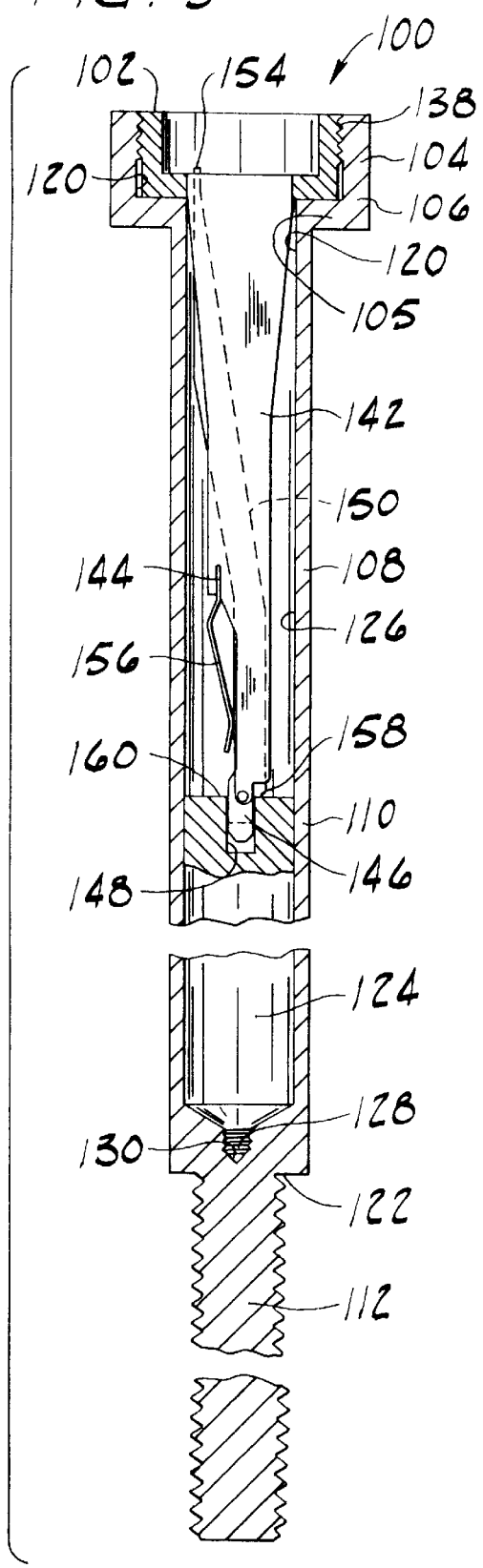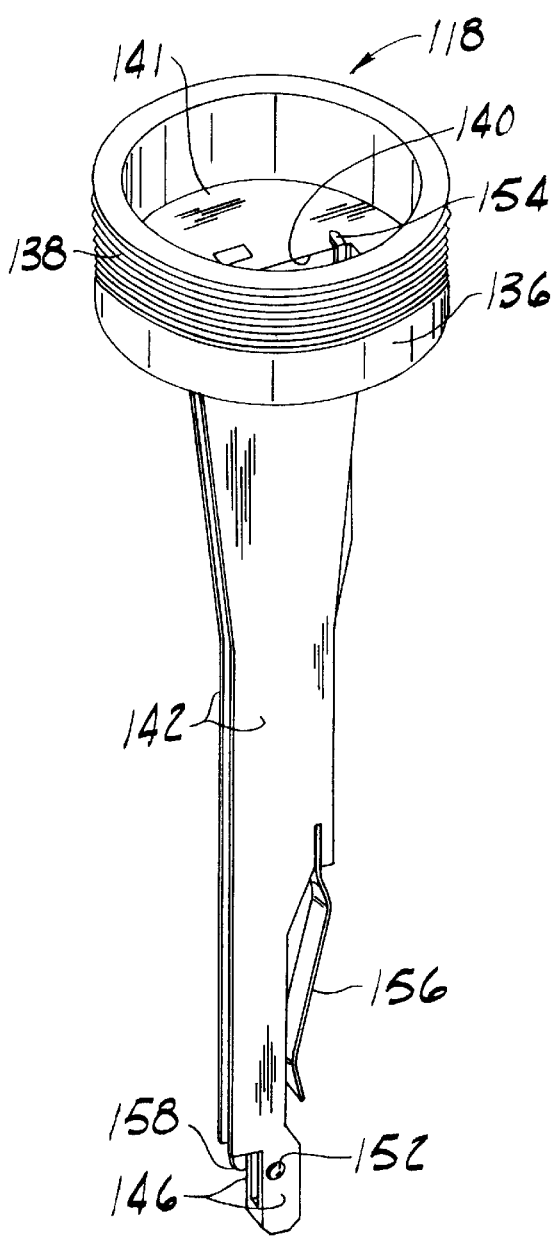

FIG. 7
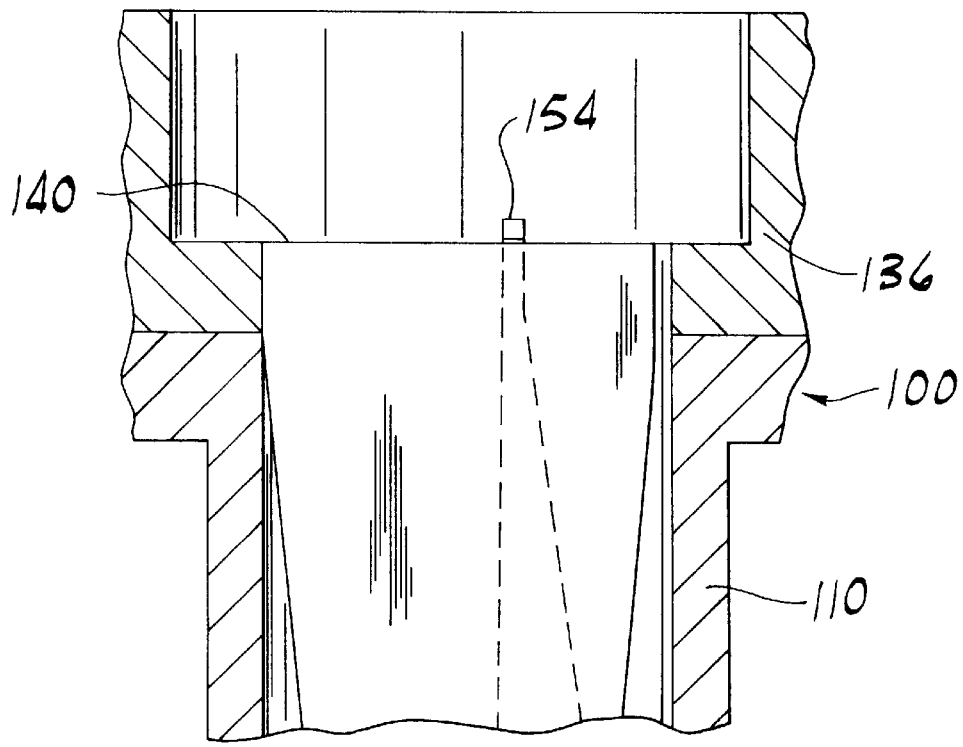
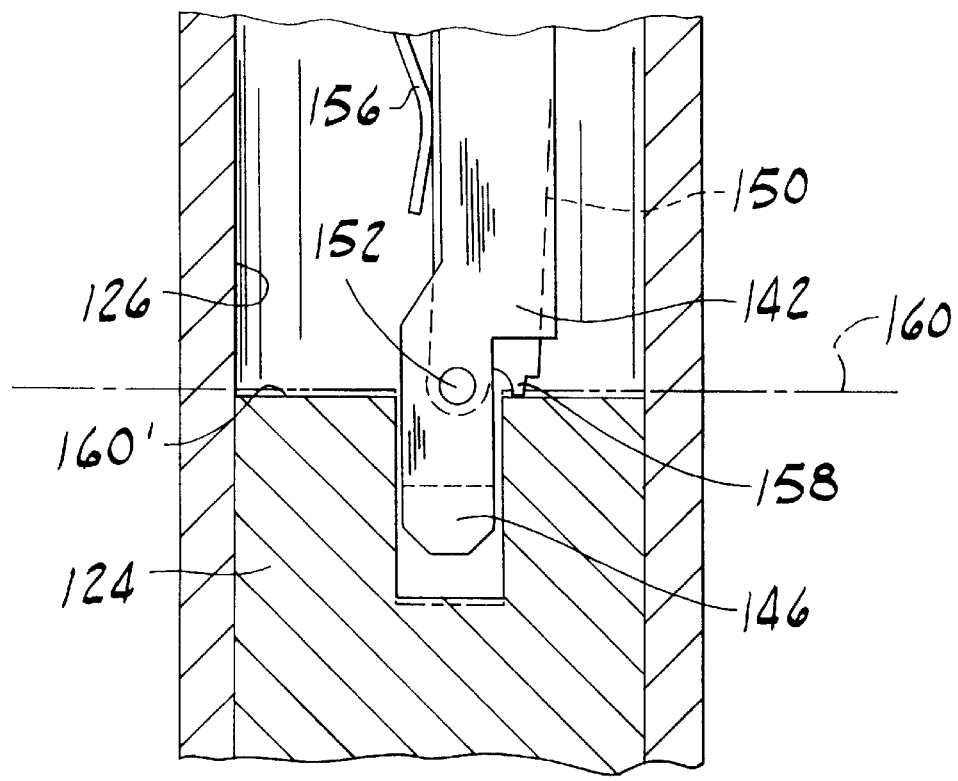

TIE-DOWN WITH STRAP AND STRAP TENSION INDICATOR

BACKGROUND OF THE INVENTION

This invention relates to tie-down devices and, more particularly, to a tie-down device having a strap and a tension indicator for indicating the tension in the strap.

Straps are often used to tie down equipment in moving vehicles such as aircraft and trucks or to hold down stationary equipment which is subject to vibration. Equipment such as tanks, containers, accumulators, and reservoirs are often susceptible to damage by a strap which is wrapped tightly around the equipment. Overtensioning of the strap may also create excessive stress on a bolt connecting two ends of the strap, resulting in failure of the bolt or strap. Insufficient tightening of the bolt may result in loosening of the strap through vibration which would allow the equipment to move from its secured position and possibly cause damage to the equipment or surrounding structure.

Previously, torque wrenches have been used to measure the torque applied to the bolt in an attempt to determine the tension in the strap. However, this method is only an indirect measurement of the tension in the strap and is often inaccurate since torque values do not accurately indicate preload and can change as threads wear or corrode. Furthermore, the torque value obtained is often unreliable and not repeatable since the thread and nut friction account for a large percent of the applied torque. Variations in the coefficient of friction due to machining, surface treatment and surface contamination, such as grease, may further vary the torque reading from the actual tension in the bolt.

SUMMARY OF THE INVENTION

The present invention overcomes the deficiencies of the prior art by providing a tie-down with a strap and an integral tension indicator for readily determining the tension in the strap to enable the strap to be properly tensioned to prevent damage to equipment held in place by the strap and reduce the chances of the equipment becoming separated from the strap. Among the features of the present invention may be noted the provision of a tie-down having a strap and tension indicator which provides a quick and accurate indication of tension in the strap and is simple to read, light weight, easy to install and economical to manufacture.

Generally, a tie-down of the present invention comprises a flexible strap adapted to be wrapped around an object to be tied down, a first member at one end of the strap having a first hole formed therein and a second member to which the other end of the strap is attached having a second hole formed therein for alignment with the first hole. The tie-down further comprises a fastener having a head and a threaded shank arranged with the head engaging the first member and the shank extending through the first and second holes and having a threaded end portion projecting out of the second hole. A nut is threaded on the projecting end portion of the shank and engaged against the second member for being turned to act through the fastener for drawing the first and second members together to tighten the strap around the object and place the fastener and the strap under a predetermined tension. The fastener has an indicator for indicting the tension in the fastener and thereby indicating the tension in the strap, the first member being formed to allow observation of the indicator.

A method of the present invention is for securing a tie-down as described above to an object, and includes the steps of wrapping the strap around the object and inserting the fastener through the first and second holes with the head engaging the first member and the shank extending through the first and second holes and an end portion of the threaded shank projecting out from the second hole. The nut is threaded on the projecting end of the threaded shank and draws the first and second members together to tighten the strap around the object and place the strap under tension. The method further includes reading the indicator to determine the tension in the strap and tightening the nut until the indicator reads the required tensile load.

Other objects and features will be in part apparent and in part pointed out hereinafter.

BRIEF DESCRIPTION OF THE DRAWINGS

FIG. 2 is a cross-sectional view taken along the plane of line 2—2 of FIG. 1;

FIG. 3 is a cross-sectional view of a bolt of the tie-down of FIG. 1;

FIG. 4 is a top view of the bolt of FIG. 3;

FIG. 5 is a cross-sectional view of a bolt of a second embodiment of a tie-down of the present invention;

FIG. 6 is a perspective of an indicator cartridge of the bolt of FIG. 5; and

FIG. 7 is a fragmentary enlarged cross-sectional view of the bolt of FIG. 5 shown in tension.

Corresponding reference characters indicate corresponding parts throughout the several views of the drawings.

Description of the Preferred Embodiments

Figure 1:
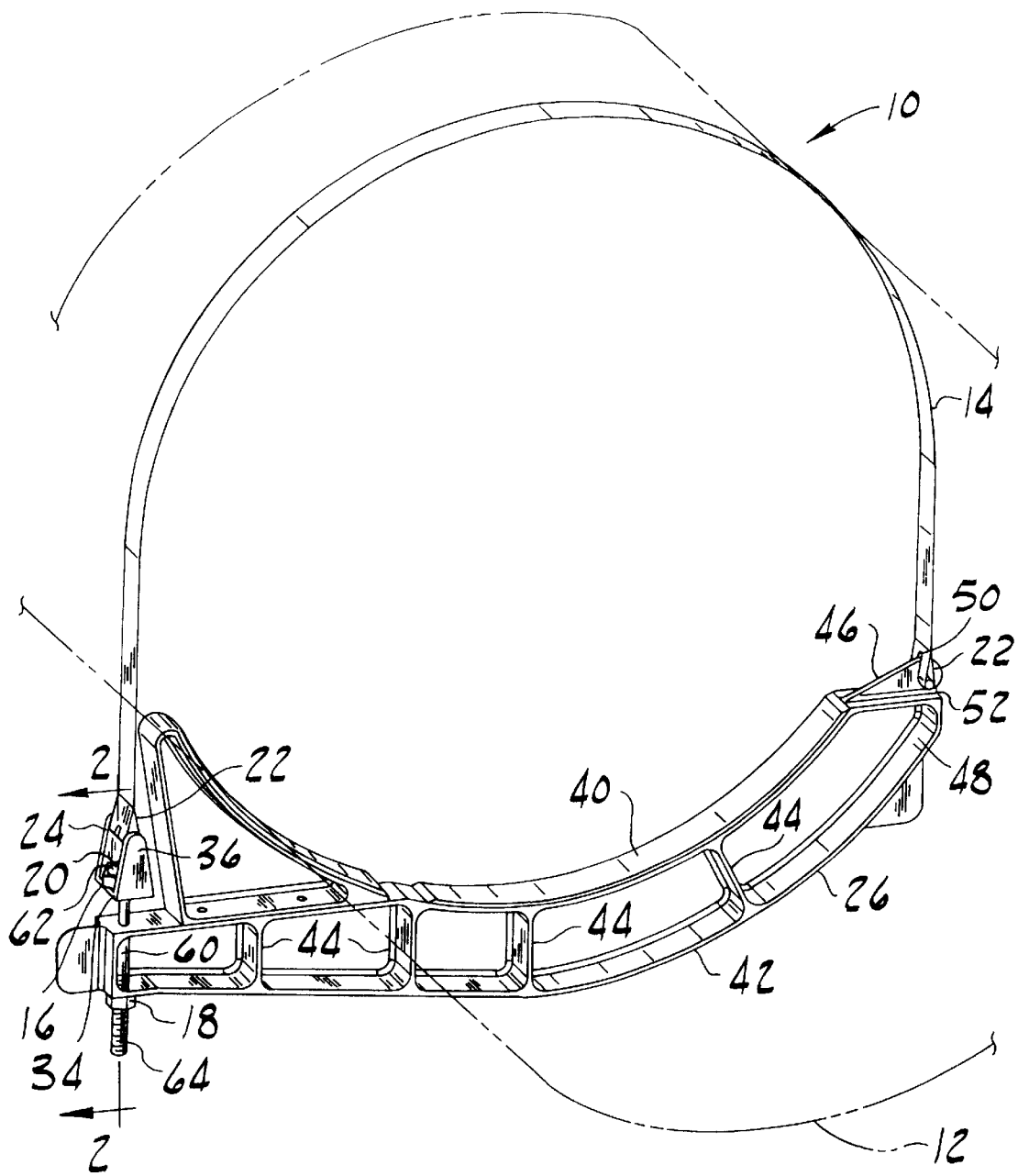
FIG. 1 is a perspective of a tie-down with a strap and strap tension indicator of the present invention.

Referring now to the drawings, and first to FIG. 1, a tie-down of the present invention is generally indicated at 10. The tie-down 10 is used to securely hold an object 12, such as a tank, accumulator, reservoir, container, or machinery securely in place. The tie-down 10 includes a flexible strap 14 adapted to be wrapped around the object 12 to be tied down, and a fastener, such as a bolt 16 having an indicator 20 for indicating the tension in the fastener and thereby indicating the tension in the strap.

The strap 14 is sized to have a length sufficient to fit around the object 12 and a width suitable for the strap to sustain the load exerted by the fastener and the object. The strap 14 may be made from steel, plastic, fabric or any other suitable material which has sufficient load carrying and tensile strength characteristics to hold the object 12. Other factors such as the environment in which the tie-down 10 will be used and safety factors should also be considered in selecting the strap material. The strap 14 may be preformed to generally conform to the shape of the object 12 or may be flat and have sufficient flexibility to conform to the shape of the object. The ends of the strap 14 are preferably looped back on themselves to form eyes 22 for attachment of first and second members 24, 26 used to connect the bolt 16 and the strap 14. The eyes 22 may also be formed in connectors (not shown) attached to the ends of the strap 14.

The first and second members 24, 26 are attached to opposite ends of the strap 14 and have first and second holes 28, 30, respectively, formed therein for receiving the bolt 16.

The first member 24 comprises a clevis having a bottom wall 34 with the first hole 28 formed therein and two side walls 36 extending generally upward from the bottom wall. A pin 38 extends between the upper ends of the side walls 36 for attachment of the eye 22 at the end of the strap 14 to the clevis 24 (FIG. 2). The clevis 24 is formed to provide adequate viewing area of the bolt 16 for observation of the indicator 20 and the pin 38 is placed a sufficient distance from the bolt so that there is no interference with the reading of the indicator on the bolt.

The second member 26 comprises a saddle for supporting objects 12 such as large tanks or reservoirs thereon (FIG. 1). The saddle 26 is generally of shallow U-shape and includes an upper surface 40 preferably shaped to conform to the object 12, a lower surface 42 generally parallel in part with the upper surface and stiffening ribs 44 extending between the two surfaces. The saddle 26 may be designed to rest upon supporting structure or may be formed as part of aircraft structure, for example. One end of the saddle 26 includes a flange 46 extending upwardly therefrom and having an opening 48 extending through the flange generally transversely to the saddle. The eye 22 in one end of the strap 14 has a notch 50 for receiving the flange 46 with the eye aligned with the opening 48 in the flange for receiving a pin 52 therethrough. The other end of the saddle 26 has upper and lower holes 54, 56 constituting the second hole 30 extending therethrough for receiving a shank 60 of the bolt 16 (FIG. 2).

The first and second members 24, 26 are preferably formed from metal, plastic, composite or any other suitable material. It is to be understood that the configuration of the first and second members 24, 26 may vary from those shown without departing from the scope of the invention.

The bolt 16 has a head 62 at one end thereof and the externally threaded shank 60 extending from the head. The bolt 16 is fitted into the first and second members 24, 26 with the head 62 engaging the first member, the shank 60 extending through the first and second holes 28, 30 and a threaded end portion 64 of the shank projecting out of the second hole. A nut 18 is threaded on the projecting end portion 64 of the shank 60 and engaged against the lower surface 42 of the second member 26 for being turned to act through the bolt 16 for drawing the first and second members 24, 26 together to tighten the strap 14 around the object 12 and place the bolt and strap under a predetermined tension. It is to be understood that any other suitable closure device having an opening for receiving the shank 60 of the bolt 16 may be used to act through the bolt to tighten the strap 14 around the object 12.

The tension indicator 20 is preferably formed as part of the bolt 16. As shown in FIG. 3, the bolt 16 includes a bore 70 extending longitudinally through the bolt head 62 and a portion of the shank 60. A plug 72 is located within the bore 70 and has a lower end 74 (lower as shown in FIG. 3) threadably engaged with a lower end 76 of the bore, and an upper free end 78 which is free to move axially within the bore. When a tensile load is applied to the bolt 16, the shank 60 of the bolt stretches and pulls the lower end 74 of the plug 72 downward thereby moving the upper end 78 of the plug in a downward direction (downward as shown in FIG. 3).

The indicator 20 further comprises an indicator member or spring 80 having a pointer 82 disposed at an upper end thereof. The indicator spring 80 is positioned within the bore 70 with its lower end 84 in engagement with the upper free end 78 of the plug 72 and the pointer 82 located adjacent a clear viewing slot 86 at the upper surface 88 of the head 62 of the bolt 16 for viewing the pointer. The indicator spring 80 is generally U-shaped having two upper ends and formed by a bent strip of sheet metal, for example. One of the upper ends of the spring constitutes the pointer 82 and is free to move along the length of the viewing slot 86 to indicate the tension in the bolt 16. The other upper end 90 of the spring is fixedly connected to the bolt at 92.

The upper end 78 of the plug 72 has a generally V-shaped notch 94 formed therein for receiving a lower end 84 of the spring 80, the arrangement being such that the sides of the notch 94 contact the lower end of the spring and sides 96 of the spring are cammed inward towards one another, moving the pointer 82 toward the fixed upper end 90 of the spring. As a tensile load is applied to the bolt 16, the plug 72 is pulled downward, thus reducing the camming force applied to the spring 80 and allowing sides 96 of the spring to move outward and the pointer 80 to move away from the fixed upper end 90 of the spring. As viewed in FIGS. 3 in 4, the pointer 82 of the spring 80 moves to the left as a tensile load is applied to the bolt 16.

The upper surface 88 of the head 62 of the bolt 16 preferably includes a scale 98 located adjacent to the clear viewing slot 86 which is calibrated to indicate the percent of proof load applied to the bolt. The scale 98 is preferably calibrated from 0 to 100% of the bolt's proof load. The viewing slot 86 allows for visual inspection of the bolt 16 while torquing the nut 18 on the shank 60 of the bolt to determine when the proper amount of load is applied. The bolt 16 is preferably calibrated within 3% of proof load and operable between a wide range of temperatures.

The indicating bolt 16 described above may be a bolt available from Valley Forge & Bolt Manufacturing Co., of Phoenix, Arizona, under the trade name "BETABOLT", for example. It is to be understood that other types of tension indicators may be used, such as the one described below, without departing from the scope of this invention.

A second embodiment of a tension indicating bolt having a tension indicator 102, is shown in FIGS. 5, 6 and 7, and generally indicated at 100. The bolt 100 has a cup-shaped head 104, the bottom of which is designated 105 and the peripheral wall of which is designated 106 and an elongate shank 108, extending down from the head. The shank 108 comprises two parts, an upper elongate tubular part 110 extending down from the bottom wall 105 of the head 104 and a reduced-diameter lower part 112 which is threaded for application of a nut. The tubular part 110 of the shank 108, which constitutes a housing for an indicator cartridge, generally indicated at 118, opens at its upper end to the bolt head 104 via an opening 120 in the bottom wall 105 of the head. The lower end of the tubular part 110 or cartridge housing is solid as indicated at 122 the juncture of the lower threaded part 112 therewith. A plug 124 is secured in the lower end portion of a bore 126 of the indicator cartridge housing 110, having a reduced diameter lower end extension 128 threaded in a tapped hole 130 in the lower end of the cartridge housing. The lower end extension 128 may also be press fit into the lower end of the cartridge housing 110.

The indicator cartridge 118 comprises a cup-shaped head 136 threaded as indicated at 138 in the cup-shaped bolt head 104. The cartridge head 136 has a diametrically extending slot 140 in a bottom wall 141 thereof, and the cartridge has two elongate side plates 142 extending down into the bore 126 in the tubular cartridge housing 110 from opposite sides of the slot. The plates 142, which are closely spaced in parallel relation, have reduced width tips 146 at their lower ends received with a loose fit in a recess 148 in the upper end of the plug 124.

An indicator member or lever 150 is located between the side plates 142 and pivotally mounted by a pivot pin 152 extending between the narrow tips 146 of the side plates 142 at its lower end thereof for swinging movement in a diametrical plane of the cartridge head 136 between the side plates. The indicator lever 150 extends up from its pivot pin 152 into the slot 140, having a narrow upper end which acts as a pointer 154 movable in the slot. The lever 150 is biased by a leaf spring 156 attached at its upper end 144 to the side plates 142 to swing about its pivot. Adjacent its lower end, the lever 150 carries a stop or contact pin 158 engageable with an upper end 160 of the plug 124, the arrangement being such that when the bolt 16 is untensioned and the upper end of the plug is in a raised position, relative to the bolt head, the lever occupies the angular position illustrated in FIG. 5 with the pointer 154 adjacent the left end of the slot 140. When tension is applied to the bolt 100, the upper end 160 of the plug 124 moves downward as shown in FIG. 7 at 160 ', with reference to the location of the upper end of the plug at 164 when the bolt is untensioned. The indicator lever 150 pivots in a clockwise direction as viewed in FIG. 7, and the pointer moves toward the right end of the slot 140.

The indicator cartridge 118 may be one available from Valley Forge & Bolt Manufacturing Co., of Phoenix, Ariz., under the trade designation "MAXBOLT", for example.

The bolt 100 may be formed integrally as one piece or may be formed from separate pieces. For example, the tubular part 110 may be welded to the cup-shaped head and threaded lower part 112. The bolt 100 is preferably formed from titanium but may be made from any other suitable material. The bolt 100 may be designed for use with a tension load in the range of 1000–1400 lbs. (454–635 kg), and have a length of 6.55 in. (16.6 cm), with the tubular part 110 having a diameter of 0.482 in. (1.22 cm) and a wall thickness of 0.045 in. (0.11 cm), for example. The scale for the pointer 154 may be 0.070 in. (0.18 cm) wide with the pointer moving approximately 0.17 in. (0.43 cm) at 1000 lbs. (454 kg) and 0.24 in. (0.61 cm) at 1400 lbs. (635 kg), for example. It is to be understood that the bolt 100 may have configurations other than the one shown and may be formed from other materials or have different dimensions without departing from the scope of this invention.

To use the tie-down 10 of this invention, an object 12 is first placed on the saddle 26 and the strap 14 is wrapped around the object. The tension indicating bolt 16, 100 is inserted through the first and second holes 28, 30 with the head 62, 104 of the bolt engaging the bottom wall 34 of the clevis 24 and the shank 60, 108 extending through the first and second holes 28, 30 and the end portion of the threaded shank projecting out from the second hole of the saddle. The pin 38 is then inserted through the strap 14 and attached to the clevis 24. The nut 18 is threaded on the projecting end 64, 112 of the threaded shank 60, 108 and draws the clevis 24 and saddle 26 together to tighten the strap 14 around the object 12 and place the strap under tension. The nut 18 is torqued until the indicator 20, 102 reads a predetermined tensile load.

It will be observed from the foregoing that the tie-down of this invention has numerous advantages over the prior art. Importantly, the tension indicator 20, 102 allows an operator to determine the tension in the strap 14 while the nut 18 is being torqued or at any other time by simply looking at the load scale on the head 62, 104 of the bolt 16, 100.

Furthermore, the indicator 20, 102 provides an accurate and consistent reading of the tension in the strap 14 and is not affected by friction between the threaded shank 60, 108 of the bolt 16, 100 and the nut 18 or contaminants such as grease on the shank. The tie-down is light weight, economical to manufacture and easy to install and use.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A tie-down comprising:

a flexible strap adapted to be wrapped around an object to be tied down;

a first member at one end of the strap having a first hole formed therein;

a second member to which the other end of the strap is attached having a second hole formed therein in alignment with the first hole;

a fastener having a head and a threaded shank arranged with the head engaging said first member and with the shank extending through the first and second holes and having a threaded end portion protecting out of the second hole;

a nut threaded on said projecting end portion of the shank engaged against said second member for being turned to act through the fastener for drawing said first and second members together to tighten the strap around said object and place the fastener and the strap under a predetermined tension;

the fastener having an indicator for indicating the tension in the fastener and thereby indicating the tension in the strap and said first member being formed for observation of the indicator;

the fastener has a bore extending longitudinally through the head and a portion of the shank for receiving the indicator;

the fastener includes a clear viewing slot located on an upper surface of the head of the fastener for viewing an indicating finger disposed within the bore, and a scale located adjacent the viewing slot;

the indicator comprising a plug having a lower end threadably engaged with the fastener at a lower end of the bore and an upper end free to move axially within the bore, whereby upon application of a tension load to the fastener, an axial force is applied to the plug by the fastener thereby moving the upper end of the slug in a downward direction;

the head of the fastener is cup-shaped and the shank has a tubular part and a threaded lower part; and wherein the tubular part is formed from titanium and the cup-shaped head and threaded lower part are welded to the tubular part.

2. A tie-down as set forth in claim 1 wherein said second member is a saddle for seating the object, the strap being attached to one end of the saddle and the second hole being formed in the other end of the saddle.

3. A tie-down as set forth in claim 1 further comprising a pin extending through an eye formed in one end of the strap and an aligned opening in the saddle to connect the strap to the saddle.

4. A tie-down as set forth in claim 1 wherein said first member comprises a clevis having the first hole opening formed therein and a pin extending between two side walls of the clevis, the strap having an eye formed at one end thereof, the pin being receivable in the eye for connecting the strap to the clevis.

5. A tie-down as set forth in claim 1 wherein the indicator comprises an indicator lever having a lower end engageable with the upper end of the plug and an upper end constituting a pointer, the pointer being movable in a plane generally parallel to the upper surface of the head of the fastener upon movement of the plug to indicate tension applied to the fastener.

* * * * *